United States Patent
Kim et al.

(10) Patent No.: US 9,750,027 B2
(45) Date of Patent: Aug. 29, 2017

(54) METHOD AND APPARATUS FOR BEAMFORMING IN WIRELESS COMMUNICATION SYSTEM

(71) Applicant: Samsung Electronics Co., Ltd, Gyeonggi-do (KR)

(72) Inventors: Tae-Young Kim, Gyeonggi-do (KR); Ji-Yun Seol, Gyeonggi-do (KR); Hyun-Kyu Yu, Gyeonggi-do (KR); Su-Ryong Jeong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/887,104

(22) Filed: May 3, 2013

(65) Prior Publication Data

US 2013/0295852 A1 Nov. 7, 2013

(30) Foreign Application Priority Data

May 4, 2012 (KR) ......................... 10-2012-0047584

(51) Int. Cl.

| | |
|---|---|
| *H04B 1/00* | (2006.01) |
| *H04W 72/04* | (2009.01) |
| *H04W 16/28* | (2009.01) |
| *H01Q 3/26* | (2006.01) |
| *H04L 5/00* | (2006.01) |
| *H04B 7/0413* | (2017.01) |
| *H04B 7/06* | (2006.01) |

(52) U.S. Cl.
CPC ............ *H04W 72/046* (2013.01); *H01Q 3/26* (2013.01); *H04B 7/0413* (2013.01); *H04B 7/0617* (2013.01); *H04L 5/0025* (2013.01); *H04L 5/0044* (2013.01); *H04L 5/0048* (2013.01); *H04L 5/0053* (2013.01); *H04W 16/28* (2013.01)

(58) Field of Classification Search
CPC .... H04W 72/04; H04W 72/046; H04W 16/28
USPC .......................................... 455/63.4, 450, 25
See application file for complete search history.

(56) References Cited

U.S. PATENT DOCUMENTS

| | | | | |
|---|---|---|---|---|
| 2004/0061645 | A1* | 4/2004 | Seo | ........................... H01Q 3/24 342/383 |
| 2004/0242156 | A1* | 12/2004 | Tiirola | .................. H04B 7/005 455/25 |
| 2005/0153657 | A1* | 7/2005 | Maruta | .................... H01Q 3/26 455/63.4 |

(Continued)

FOREIGN PATENT DOCUMENTS

| | | |
|---|---|---|
| CA | 2 795 725 | 10/2011 |
| CN | 1451250 A | 10/2003 |

(Continued)

OTHER PUBLICATIONS

International Search Report dated Aug. 21, 2013 in connection with InternationalPatent Application No. PCT/KR2013/003880, 3 pages.

(Continued)

*Primary Examiner* — Md Talukder (57) ABSTRACT

A method and an apparatus for operating a transmitter in a millimeter wave communication system is provided. In the method, information of a common and/or control channel is mapped to a dedicated frequency region of a dedicated Radio Frequency (RF) path. Data is mapped to a common frequency region for a common RF path.

16 Claims, 11 Drawing Sheets

(56) References Cited

U.S. PATENT DOCUMENTS

| | | | |
|---|---|---|---|
| 2005/0181799 A1* | 8/2005 | Laroia | H04B 17/24 455/450 |
| 2006/0221908 A1* | 10/2006 | Hoshina | H04B 1/707 370/335 |
| 2006/0268769 A1* | 11/2006 | Pan | H04B 7/0626 370/328 |
| 2007/0110104 A1 | 5/2007 | Sartori et al. | |
| 2007/0121573 A1* | 5/2007 | Zuckerman | H04W 92/02 370/350 |
| 2007/0190951 A1* | 8/2007 | Lampinen | H04B 7/061 455/101 |
| 2007/0287384 A1* | 12/2007 | Sadri | H04W 76/028 455/63.4 |
| 2008/0070632 A1* | 3/2008 | Obuchi | H04W 74/0866 455/561 |
| 2009/0258647 A1* | 10/2009 | Yamada | H04B 1/7143 455/435.1 |
| 2009/0285193 A1* | 11/2009 | Kim | H04L 5/0007 370/342 |
| 2010/0016005 A1* | 1/2010 | Sugawara | H04J 13/0059 455/509 |
| 2010/0135238 A1* | 6/2010 | Sadri | H04W 72/0453 370/329 |
| 2010/0150083 A1* | 6/2010 | Toda | H04W 72/085 370/329 |
| 2010/0246495 A1 | 9/2010 | Jin | |
| 2010/0265924 A1 | 10/2010 | Yong et al. | |
| 2010/0322229 A1* | 12/2010 | Kim | H04L 5/0092 370/345 |
| 2011/0182174 A1* | 7/2011 | Pi | H04W 88/10 370/229 |
| 2011/0194514 A1 | 8/2011 | Lee et al. | |
| 2011/0243040 A1* | 10/2011 | Khan | H04B 7/0617 370/280 |
| 2012/0044870 A1* | 2/2012 | Mochizuki | H04B 7/024 370/328 |
| 2012/0051355 A1 | 3/2012 | Rofougaran | |
| 2012/0057558 A1* | 3/2012 | Prasad | H04W 52/346 370/329 |
| 2012/0076224 A1 | 3/2012 | Schwartz et al. | |
| 2013/0190000 A1* | 7/2013 | Boudreau | H04W 16/26 455/449 |
| 2013/0201923 A1* | 8/2013 | Ren | H04L 5/0053 370/329 |
| 2013/0223402 A1* | 8/2013 | Feng | H04L 5/0007 370/330 |
| 2013/0295852 A1* | 11/2013 | Kim | H04W 16/28 455/63.4 |
| 2013/0343303 A1* | 12/2013 | Kim | H04B 7/0452 370/329 |
| 2014/0050183 A1* | 2/2014 | Mochizuki | H04W 72/1278 370/329 |

FOREIGN PATENT DOCUMENTS

| | | |
|---|---|---|
| CN | 101243668 A | 8/2008 |
| CN | 102113241 A | 6/2011 |
| KR | 10-2004-0027210 | 4/2004 |
| WO | 0172081 A1 | 9/2001 |
| WO | 2007146733 A1 | 12/2007 |
| WO | WO 2007/146733 A1 | 12/2007 |
| WO | WO 2010/123237 A2 | 10/2010 |

OTHER PUBLICATIONS

Written Opinion of the International Searching Authority dated Aug. 21, 2013 in connection with International Patent Application No. PCT/KR2013/003880, 7 pages.

Vodafone, "Cooperative Multipoint Performance Evaluation Based on Simulation and Trial Measurements in Easy-C Project", 3GPP TSG RAN WG1, Meeting #61bis, R1-104122, Dresden, Germany, Jun. 28-Jul. 2, 2010, 8 pages.

Extended European Search Report dated Nov. 20, 2015 in connection with European Patent Application No. 13784197.9, 7 pages.

Foreign Communication From a Related Counterpart Application, Chinese Application No. 201380023801.8, Text of the First Office Action dated Feb. 3, 2017, 12 pages.

* cited by examiner

METHOD AND APPARATUS FOR BEAMFORMING IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application No. 10-2012-0047584 filed in the Korean Intellectual Property Office on May 4, 2012, the entire disclosure of which is hereby incorporated by reference.

TECHNICAL FIELD

The present disclosure relates to a millimeter wave communication system. More particularly, the present disclosure relates to an apparatus and a method for obtaining optimal performance by providing a resource allocation scheme.

BACKGROUND

A wireless communication system has evolved in a direction for supporting a higher data transmission rate in order to meet an increasing data traffic demand.

Up to now, a wireless communication system has pursued a technology development in a direction of improving a spectral efficiency mainly in order to increase a data transmission rate, but it is difficult to meet an explosively increasing data traffic demand with this only spectral efficiency improvement technology.

One of methods for meeting this is to use a very wide frequency band. Since it is very difficult to secure a wide frequency band in a frequency band (<5 GHz) currently used in a mobile communication cellular system, a millimeter wave communication system operating in a higher frequency band that can secure a wideband frequency has emerged. However, since the millimeter wave communication system performs wireless communication in a high frequency band, a high wave path loss occurs. Accordingly, a radio distance becomes relatively short to cause reduction in the coverage.

SUMMARY

To address the above-discussed deficiencies of the prior art, it is a primary object to provide a method and an apparatus for allocating a resource depending on a transmission technology in a millimeter wave communication system.

Another aspect of the present disclosure is to provide a method and an apparatus for relieving a propagation path loss and increasing a radio distance in a millimeter wave communication system.

In accordance with an aspect of the present disclosure, a method for operating a transmitter in a millimeter wave communication system is provided. The method includes allocating information of a common and/or control channel to a dedicated frequency region for a dedicated Radio Frequency (RF) path, and mapping data to a common frequency region for a common RF path.

In accordance with another aspect of the present disclosure, an apparatus of a transmitter in a millimeter wave communication system is provided. The apparatus includes at least one antenna unit including a plurality of antenna elements, a reception unit configured to receive a signal corresponding to at least one uplink transmission beam direction from a receiver, a controller configured to receive a signal from the receiver via the reception unit, determining to map information of a common and/or control channel to a dedicated frequency region for a dedicated Radio Frequency (RF) path, and determining to map data to a common frequency region for a common RF path, and at least one dedicated RF path and at least one common RF path connected to respective antenna elements, each path being formed of a beam to transmit a signal to the receiver according to a transmission beam direction selected by the controller.

In accordance with still another aspect of the present disclosure, a method for operating a receiver in a millimeter wave communication system is provided. The method includes receiving information of a common and/or control channel via a dedicated frequency region for a dedicated RF path, and receiving data via a common frequency region for a common RF path.

In accordance with further another aspect of the present disclosure, an apparatus of a receiver in a millimeter wave communication system is provided. The apparatus includes a reception unit configured to receiving at least one signal transmitted via at least one transmission beam direction by a transmitter, a channel estimator configured to estimate a channel corresponding to the at least one transmission beam direction using a signal transmitted by the transmitter, and a controller configured to obtain information of a common and/or control channel allocated to a dedicated frequency region of a dedicated RF path via the reception unit from the transmitter, and obtaining data allocated to a common frequency region of a common RF path.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents.

Exemplary embodiments of the present disclosure provide a method and an apparatus for allocating a resource depending on a transmission technique in a millimeter wave communication system.

As a transmission frequency for wireless communication of a millimeter wave communication system is raised, a propagation path loss increases. Accordingly, a radio distance becomes relatively short, so that reduction in the coverage may be caused.

One of important technologies for addressing this issue, or relieving a propagation path loss and increasing a radio distance is a BeamForming (BF) technology.

Generally, transmission BF is a method for concentrating signals transmitted from each antenna in a specific direction using a plurality of antennas. A plurality of gathered antenna is referred to as an antenna array, and an antenna in an antenna array is referred to as an antenna element.

When the transmission BF is used, a radio distance can be increased and signals are nearly not transmitted to other directions except for a relevant direction, so that the interference on other users reduces remarkably.

Meanwhile, a receiver can receive beams using a reception antenna array, which also concentrates reception of radio waves in a specific direction to increase the signal reception sensitivity in a relevant direction and excludes signals in other directions than the relevant direction, thereby blocking interference signals.

As a transmission frequency increases, the wavelength of a radio wave becomes short, so that in the case where antennas are configured with a half-wavelength interval, an antenna array can include a larger number of antennas in the same size area. That is, since a communication system operating in a high frequency band can obtain a relatively higher antenna gain than a communication system using a BF technology in a low frequency band, it is an advantageous for the system to apply the BF technology.

Figure 1:
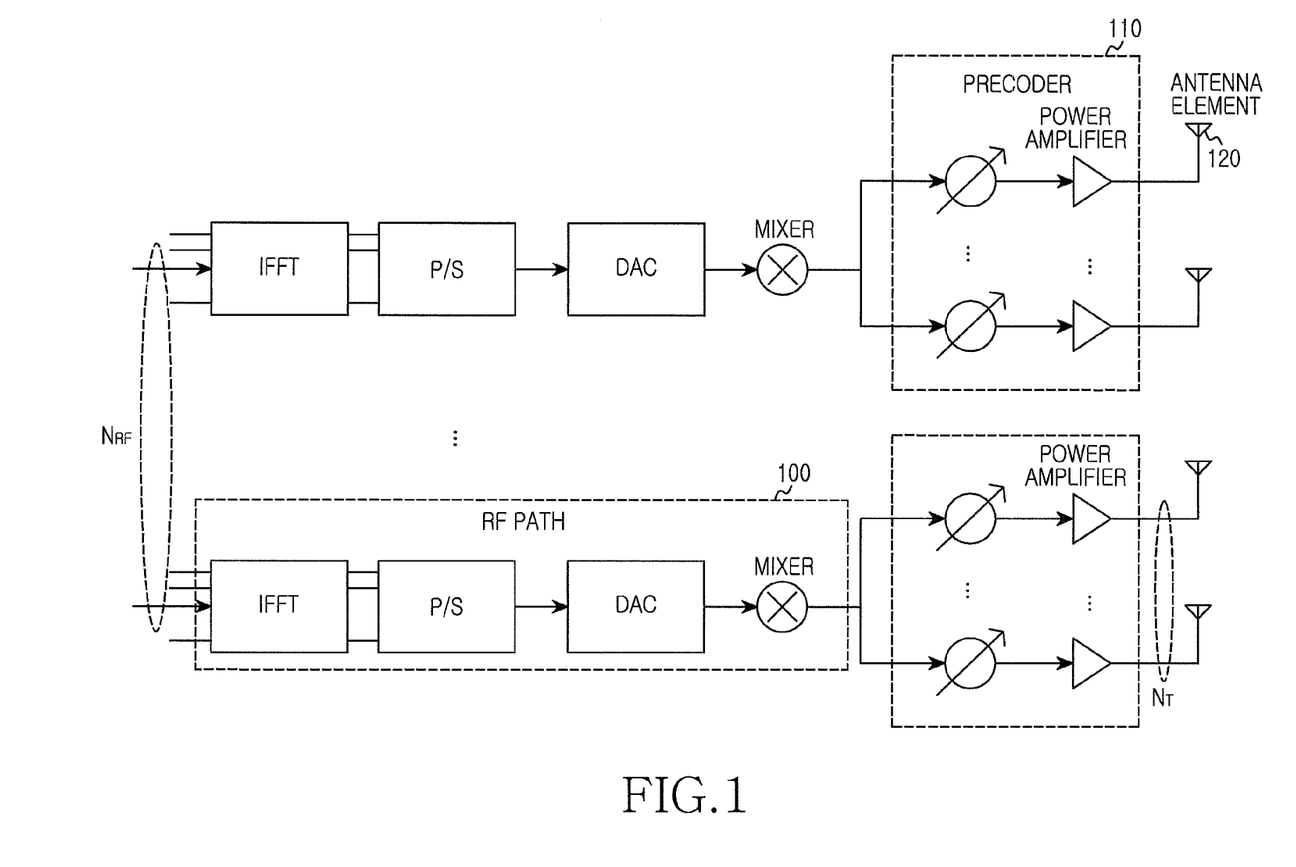
FIG. 1 illustrates a transmitter structure in a millimeter wave communication system according to an embodiment of the present disclosure.

FIG. 1 is illustrates a high-level transmitter structure in a millimeter wave communication system according to an embodiment of the present disclosure.

Referring to FIG. 1, a transmitter structure includes elements for implementing a BF transmission technology. One transmission signal is transmitted via a plurality of antenna elements 120, so that transmission signals are concentrated and a high antenna gain is obtained.

The transmitter forms a beam at an RF precoder 110 with consideration of transmitter complexity and realization costs. However, the relevant BF transmitter has a limitation that it cannot transmit other signals using the other beams via different frequency resources at the same time. To address this issue, a plurality of RF paths 100 is introduced.

One RF path includes an Inverse Fast Fourier Transform (IFFT) module, a parallel-serial conversion module, a Digital-to-Analog Conversion (DAC) module, a mixer module, and the like.

In the case where the number of RF paths increases, the complexity and cost also increases. Therefore, the transmitter of FIG. 1 represents a transmitter structure that performs RF BF using a limited number of a plurality of RF paths.

Figure 2:
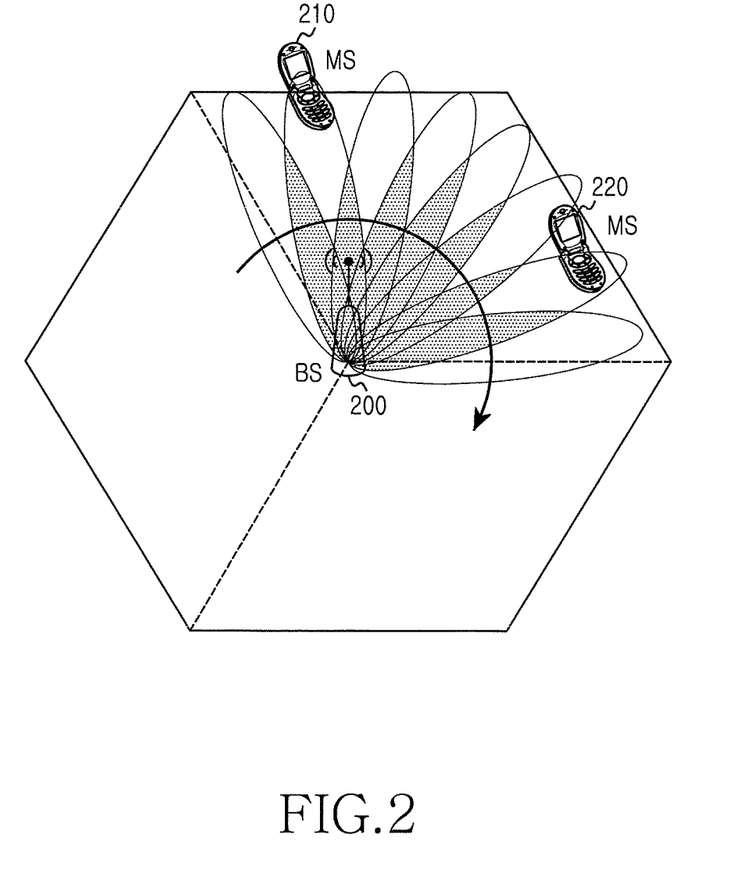
FIG. 2 illustrates an embodiment of transmitting information through a common/control channel using beamforming (BF) in a millimeter wave communication system according to the present disclosure.

FIG. 2 illustrates an embodiment for transmitting information of a common/control channel using beamforming (BF) in a millimeter wave communication system according to the present disclosure.

Referring to FIG. 2, information of a common/control channel in a wireless communication system is transmitted to all mobile stations (MS) 210 and 220 included in a serving base station 200. When not properly receiving the information of the common/control channel, the MS 210 and 220 cannot access the serving base station 200 and thus cannot receive a communication service.

Also, transmission of the information of the common/control channel cannot employ a Hybrid Automatic Retransmit reQuest (HARQ) technique for improving reception performance by retransmitting the same information when initial transmission fails.

Therefore, the information of the common/control channel is transmitted using a modulation technique which has a low encoding rate and is strong against channel deterioration so that the information of the relevant common/control channel can be received to all MS 210 and 220 within the service area without an error.

In the millimeter wave communication system, to guarantee signal reception reliability of the information of the common/control channel, an antenna gain via BF should be guaranteed, besides a transmission condition of the general wireless communication system.

However, since transmission of the information of the common/control channel is based on all of UEs served by the base station 200, an antenna gain cannot be obtained by concentrating a beam in a specific direction.

Therefore, beams are formed as illustrated in FIG. 2 and information of the same common/control channel is transmitted to all directions, so that transmission requirement of the information of the common/control channel can be met.

To transmit beams having a narrow beam width to all directions, different time resources need be allocated, or simultaneous transmissions via a plurality of RF paths need be conducted.

In other words, the millimeter wave communication system uses a BF transmission technique that allows all mobile stations (MS) to receive relevant common/control channel information by transmitting information of the same common/control channel via different beams.

Figure 3:
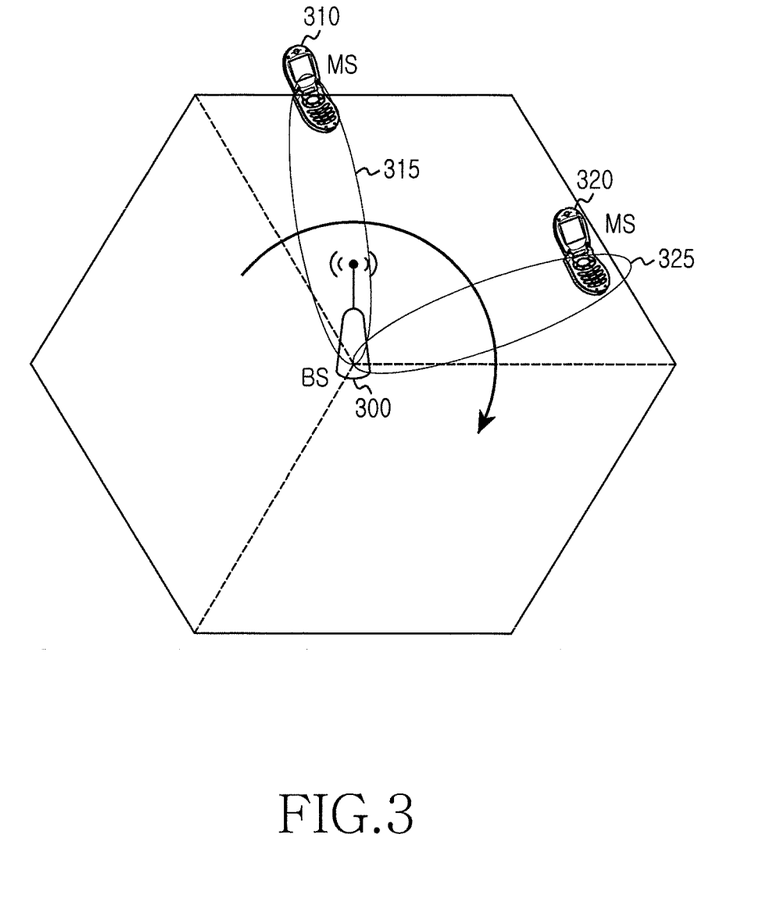
FIG. 3 illustrates an embodiment of transmitting data through a data channel using BF in a millimeter wave communication system according to an embodiment of the present disclosure.

FIG. 3 illustrates an embodiment of transmitting a data channel using BF in a millimeter wave communication system according to the present disclosure.

Referring to FIG. 3, before the millimeter wave communication system transmits a data channel, mobile stations (MS) 310 and 320 need determine their respective optimal transmission/reception beam.

For example, in the Institute of Electrical and Electronics Engineers (IEEE) 802.11ad standard, an optimal transmission beam can be determined via a Sector Level Sweep (SLS) procedure. When an optimal transmission beam is determined via this procedure, a data channel is formed with the MS using the determined beam.

As in FIG. 3, the serving base station 300 establishes a data channel with the MS 310 and 320 using beams 315, 325 respectively, which were determined by the beam select procedure.

This transmission method is different from the method of transmitting information of a common/control channel illustrated in FIG. 2. Since information of a common/control channel is not MS specific, but should be transferred to all MSs, a transmission via all beams is used.

In contrast, since data for a specific MS is transmitted under a state where an optimal beam of a relevant user is already determined, a technique of transmitting a data using the relevant transmission beam is used.

Figure 4A:
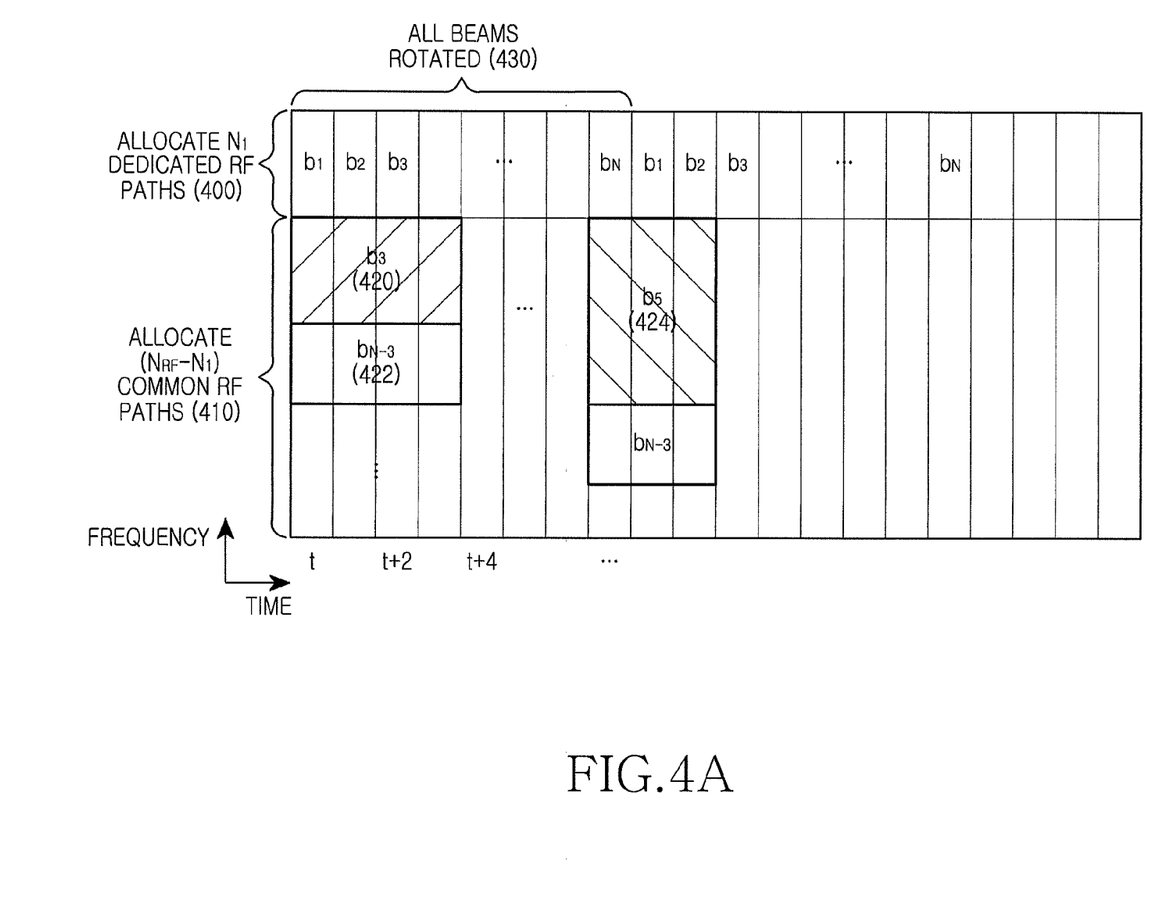
FIGS. 4A and 4B illustrate frame structures for allocating different frequency-time resources depending on BF transmission techniques according to embodiments of the present disclosure.
Figure 4B:
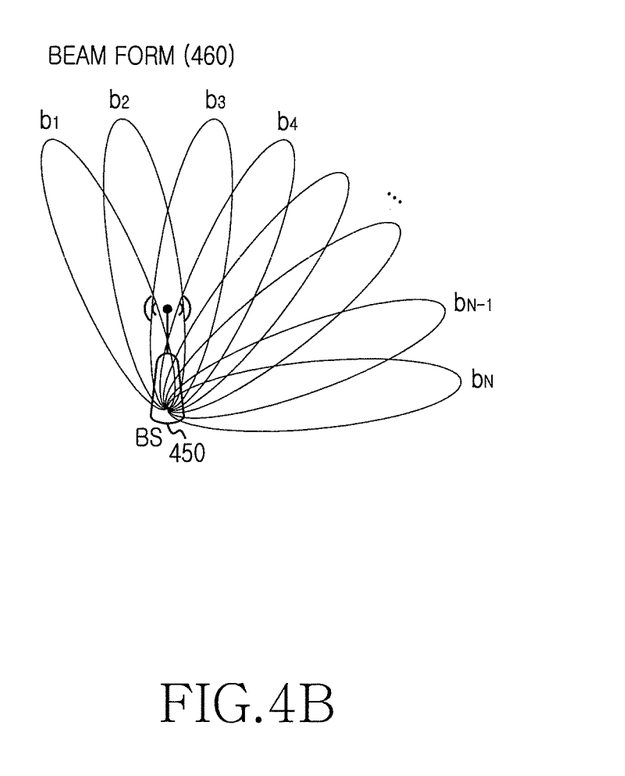

FIGS. 4A and 4B illustrate a frame structure for allocating different frequency-time resources depending on the type of a BF transmission technique according to an embodiment of the present disclosure.

Referring to FIG. 4, as described with reference to FIGS. 2 and 3, the millimeter wave communication system adopts different BF transmission techniques for transmission of information of a common/control channel and transmission via data channel.

In case of transmission via a data channel, a base station (BS) transmits information one time via an optimal transmission beam obtained via a beam select procedure. In contrast, in case of transmission of information of a common/control channel, the BS repeatedly transmits the same information using all beams.

The repetitive transmission method is also used for transmission for determining a beam. When the repetitive BF transmission technique is performed too often, the system overhead increase and system capacity reduction are caused.

To maximize the system efficiency by differentiating transmission methods for each channel in the millimeter wave communication system, the present disclosure divides frequency-time resources and applies different BF transmission techniques.

As illustrated in FIG. 1, the structure of the transmitter considered by the present disclosure uses different RF paths in order to use different BF transmission techniques. Therefore, to apply different BF transmission techniques for each frequency-time resource, different RF paths need to be allocated for each resource.

That is, information of a common/control channel is transmitted via $N_1$ RF paths and a frequency resource 400 is allocated thereto. Also, data through a data channel is transmitted via $(N_{RF}-N_1)$ RF paths and a frequency resource 410 is allocated thereto.

A BF transmission technique applied to the frequency resource 400 of the information of the common/control channel repeatedly transmits all beams 460 of FIG. 4B transmitted by the BS 450 of FIG. 4B in regular sequence. In other words, beams are transmitted by all of the beams and the all beams are repeatedly transmitted in the same sequence, referring to 430.

In this frame structure, a transmission technique of allocating the information of the common/control channel to the frequency resource 400 and repetitive performing BF in all directions is used. Therefore, the millimeter wave communication system can transfer information of the common/control channel to all MSs using this BF transmission technique.

A BF transmission technique applied to the frequency resource 410 of the data channel transmits data using an optimal transmission beam obtained via a beam select procedure between the BS 450 and MSs connected to the BS 450.

That is, an MS that uses a frequency resource 420 allocated thereto receives data using a reception beam called 'b3'. Likewise, an MS that uses a frequency resource 424 allocated thereto receives data using a reception beam 'b5'. Also, an MS that uses a frequency resource 422 allocated thereto receives data using a reception beam called '$b_{N-3}$'.

Figure 5:
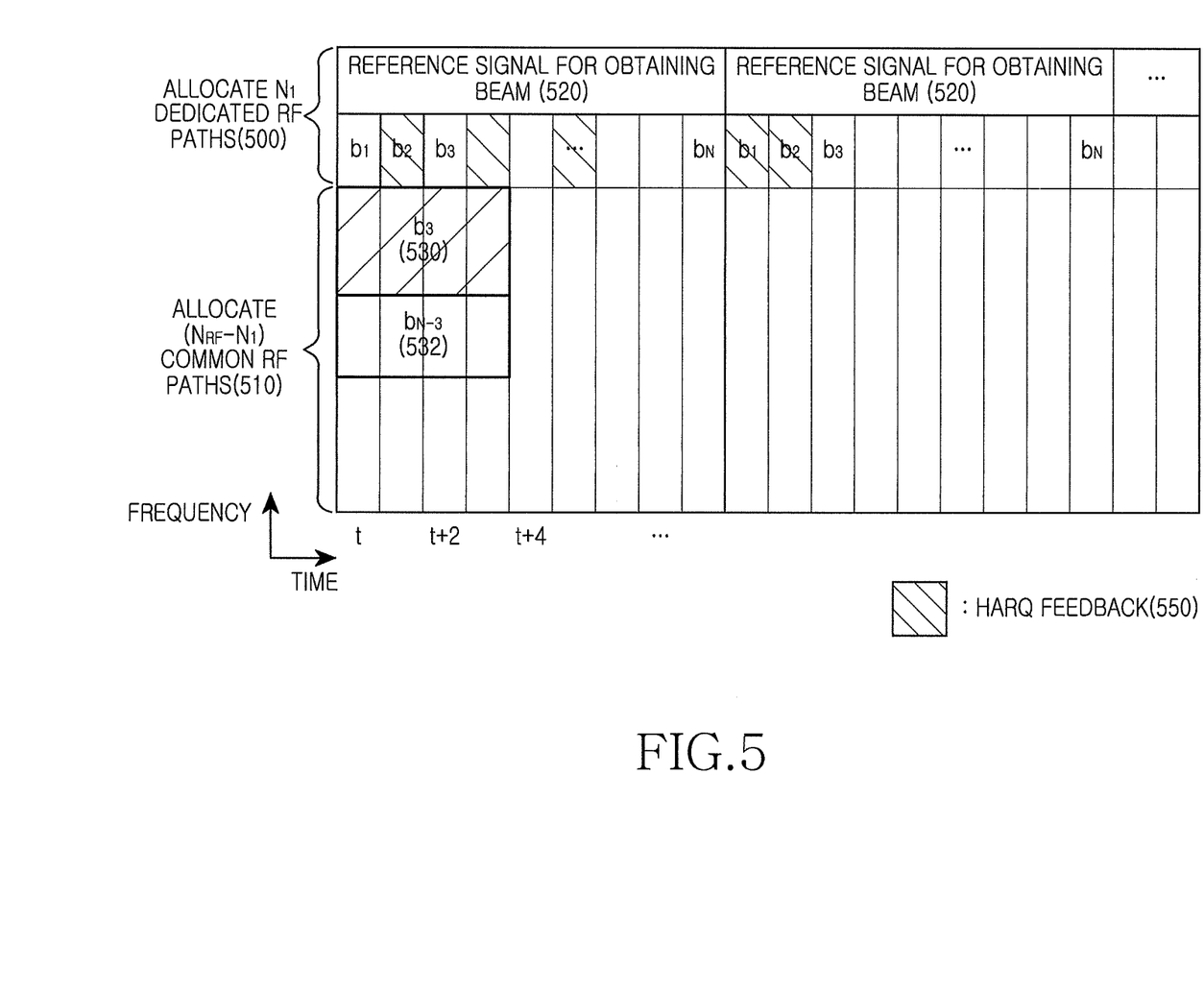
FIG. 5 illustrates an embodiment of applying different BF transmission techniques by mapping a control channel and a data channel to frequency-time resources according to the present disclosure.

FIG. 5 illustrates an example of applying different BF transmission techniques by allocating a control channel and a data channel to frequency-time resources according to an embodiment of the present disclosure.

Referring to FIG. 5, the same BF transmission method as the method of transmitting information of a data channel in the millimeter wave communication system can be used for transmitting information of a common/control channel. For example, before transmission/reception of data, a beam select procedure can be performed between a transmitter and a receiver. One of beam select methods is a method of allocating all beams to resources that lie at right angles to find out an optimal transmission/reception beam. Therefore, reference signals required for determining a beam are included in a specific frequency resource 520 among frequency resources 500 allocated for transmitting information of the common/control channel and transmitted, so that an optimal transmission/reception beam can be found.

All of the MSs connected to the serving BS periodically check and update a beam state of themselves. Since the reference signals for determining a beam illustrated in FIG. 5 are repeatedly transmitted via a specific frequency resource 520, all MS can efficiently maintain and update their respective beam.

Besides BF repetitive transmission of information of a common/control channel and reference signals for determining a beam, in the case where small information is included and should be periodically transmitted, for example, in case of transmitting an HARQ feedback 550 or a VoIP data signal, a relevant signal or information can be allocated to a frequency resource 500.

As described above, in the case where frequently repeatedly transmitted signals are mapped to a frequency resource 510 to which a data channel is allocated, a corresponding control signal is additionally required, so that the entire system overhead increases.

To solve this problem, frequently repeatedly transmitted signals are mapped to the frequency resource 500. Since all beams are repeatedly allocated to the frequency resource 500, an MS can use the resource without an additional RF path and allocation of a control signal by the serving BS by receiving the resource at an appropriate beam reception point.

A BF transmission technique applied to the frequency resource 510 of the data channel transmits/receives information of the data channel using an optimal transmission/reception beam obtained via a beam obtain procedure between the BS and MS connected to the BS.

That is, an MS that uses a frequency resource 530 allocated thereto receives data using a reception beam called 'b3'. Likewise, a user who uses a frequency resource 532 allocated thereto receives data using a reception beam $b_{N-3}$.

Figure 6:
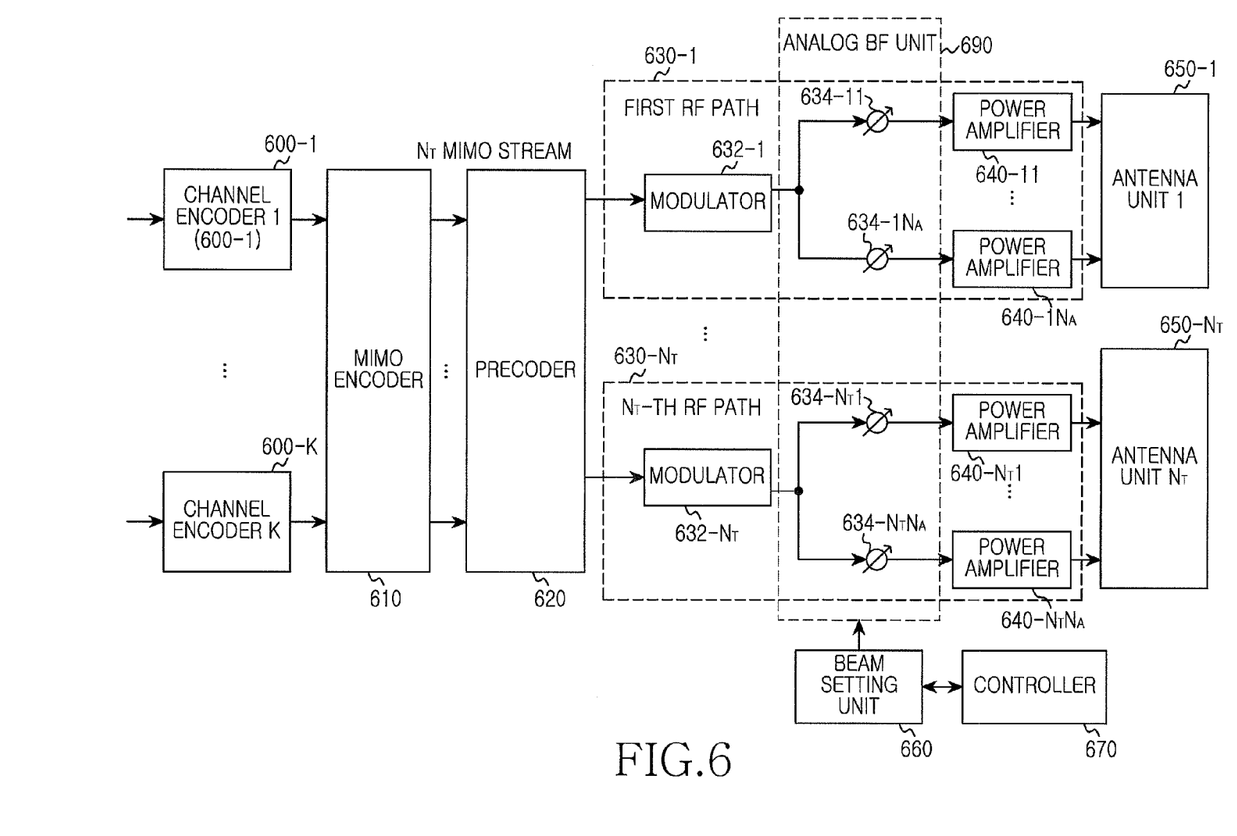
FIG. 6 is a high-level block diagram of a transmitter according to an embodiment of the present disclosure.

FIG. 6 is a block diagram illustrating a transmitter according to an embodiment of the present disclosure. Here, it is assumed that the transmitter uses a digital/analog hybrid BF and can represent a transmitter of an MS and a BS. FIG. 6 illustrates the transmitter of FIG. 1 in a different form.

Referring to FIG. 6, as illustrated, the transmitter includes K channel encoding units 600-1 to 600-K, an MIMO encoder 610, a precoder 620, $N_T$ RF paths 630-1 to 630-$N_T$, $N_T$ antenna units 650-1 to 650-$N_T$, a beam setting unit 660, a controller 670, and an analog BF unit 690.

Each of the K channel encoding units 600-1 to 600-K includes a channel encoder and a modulator, and encodes and modulates a signal to transmit to a receiver and outputs the encoded signal.

The MIMO encoder 610 multiplexes modulated signals provided from the K channel encoding units 600-1 to 600-K as signals to transmit via $N_T$ streams and outputs the multiplexed signals in order to transmit the signals via the $N_T$ antenna units 650-1 to 650-$N_T$.

The precoder 620 pre-codes the $N_T$ signals provided from the MIMO encoder 610 as pre-codes for digital BF and provides the precoded signals the respective RF paths 630-1 to 630-$N_T$.

Each of the $N_T$ RF paths 630-1 to 630-$N_T$ processes the signals provided from the precoder 620 in order to output the signals via the relevant antenna units 650-1 to 650-$N_T$. At this point, the $N_T$ RF paths 630-1 to 630-$N_T$ are configured in the same form. Accordingly, in the following description, the construction of a first RF path 630-1 is described representatively. At this point, the rest of the RF paths 630-2 to 630-$N_T$ are configured in the same form.

The first RF path 630-1 includes a modulator 632-1, an analog BF unit 690, and $N_A$ power amplifiers 640-11 to 640-1$N_A$. Here, $N_A$ denotes the number of antenna elements forming the antenna unit 1 650-1.

The modulator 632-1 modulates a signal provided from the precoder 620 according to a communication scheme and outputs the modulated signal. For example, the modulator 632-1 includes an Inverse Fast Fourier Transform (IFFT) operator and a DAC. The IFFT operator converts a signal provided from the precoder 620 to a signal in a time domain via an IFFT operation. The DAC converts the signal in the time domain provided from the IFFT operator to an analog signal. In other words, the modulator 632-1 allocates a resource for an MS with respect to a frequency region under control of the controller 670.

The analog BF unit 690 changes the beam direction of transmission signals provided from the modulator 632-1 according to a control signal indicating a transmission beam direction provided from the beam setting unit 660.

For example, the analog BF unit 690 includes a plurality of phase shifters 634-11 to 634-1$N_A$. The modulator 632-1 divides signals into $N_A$ signals and splits them into the phase shifters 634-11 to 634-1$N_A$. Each of the phase shifters 634-11 to 634-1$N_A$ changes the phase of a signal provided from the modulator 632-1 according to a control signal indicating a transmission beam direction provided from the beam setting unit 660. Each of the power amplifiers 640-11 to 640-1$N_A$ amplifies the power of a provided signal and outputs the amplified signal through the air via the antenna unit 1 650-1.

The beam setting unit 660 selects a transmission beam direction to use in transmitting a signal under control of the controller 670, and provides a control signal corresponding to the selected transmission beam direction to the analog BF unit 690.

For example, the beam setting unit 660 provides a reference signal or a preamble/midamble or a control signal corresponding to a transmission beam direction via which data is to be transmitted to the analog BF unit 690 under control of the controller 670.

For another example, the beam setting unit 660 selects a transmission beam direction that can obtain an optimal transmission efficiency for a receiver with consideration of channel information corresponding to each transmission beam direction provided from an MS under control of the controller 670.

The controller 670 controls the beam setting unit 660 to select a transmission beam direction. For example, the controller 670 controls the beam setting unit 660 to transmit a reference signal or data via each transmission beam direction that can be supported by the transmitter. For another example, the controller 670 controls the beam setting unit 660 to select an optimal transmission beam direction with consideration of channel information regarding a transmission beam direction provided from the receiver.

The transmitter can receive an optimal transmission beam direction selected by the receiver from the receiver. In this case, the beam setting unit 660 provides a control signal and data corresponding to the transmission beam direction selected by the receiver to the analog BF unit 690.

The controller 670 of the transmitter can transmit a control signal to a counterpart node, for example, serving BS, neighbor BS, or MS.

Figure 7:
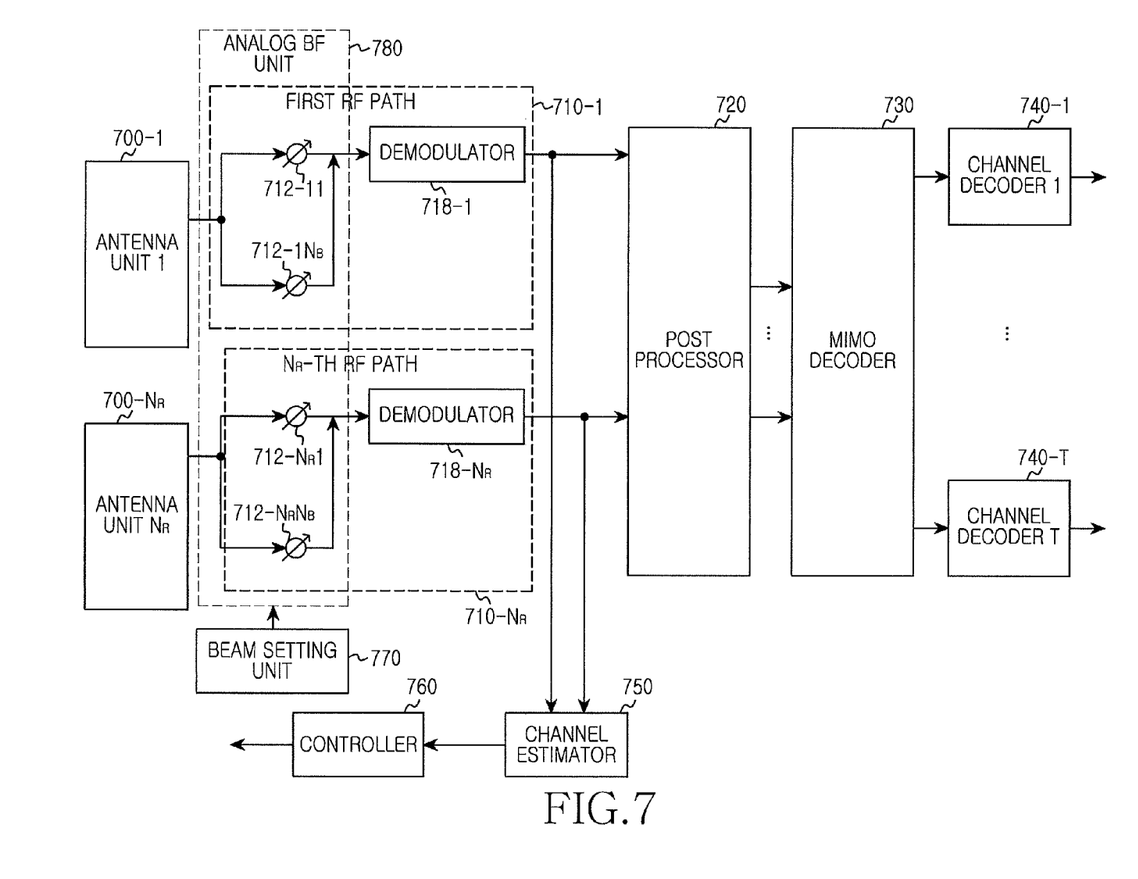
FIG. 7 is a high-level block diagram of a receiver according to an embodiment of the present disclosure.

FIG. 7 is a block diagram illustrating a receiver according to an embodiment of the present disclosure. Here, it is assumed that the receiver uses a method that can receive a beam by a digital/analog hybrid BF, and can represent a receiver of an MS and a BS.

Referring to FIG. 7, the receiver includes $N_R$ antenna units 700-1 to 700-$N_R$, $N_R$ RF paths 710-1 to 710-$N_R$, a post processor 720, an MIMO decoder 730, T channel decoding units 740-1 to 740-T, a channel estimator 750, a controller 760, and a beam setting unit 770.

Respective $N_R$ RF paths 710-1 to 710-$N_R$ process a signal received via relevant $N_R$ antenna units 700-1 to 700-$N_R$, respectively. At this point, the $N_R$ RF paths 710-1 to 710-$N_R$ are configured in the same form. Accordingly, in the following description, the construction of the first RF path 710-1 is described below representatively. At this point, the rest of the RF paths 710-2 to 710-$N_R$ are configured in the same form.

The first RF path 710-1 includes an analog BF unit 780 and a demodulator 718-1. Here, $N_B$ denotes the number of antenna elements forming the antenna unit 1 700-1.

The analog BF unit 780 changes the direction of $N_B$ reception signals provided from the antenna elements forming the antenna unit 1 700-1 according to a transmission beam direction provided from the beam setting unit 770. For example, the analog BF unit 780 includes a plurality of phase shifters 712-11 to 712-1$N_B$.

The antenna elements forming the antenna unit 1 700-1 divide a reception signal into $N_B$ signals and output them to the respective phase shifters 712-11 to 712-1$N_B$. The respective phase shifters 712-11 to 712-1$N_B$ change the phase of the signals provided from the antenna elements forming the antenna unit 1 700-1 depending on a reception beam direction provided from the beam setting unit 770.

The demodulator 718-1 demodulates a provided reception signal according to a communication scheme and outputs the demodulated signal. For example, the demodulator 718-1 includes an Analog to Digital Converter (ADC) and a Fast Fourier Transform (FFI) operator. The ADC converts a provided reception signal to a digital signal. The FFT operator converts a signal provided from the ADC to a signal in a frequency domain.

The post processor 720 post-decodes signals provided from the $N_R$ RF paths 710-1 to 710-$N_R$ according to a pre-coding scheme and provides the pre-coded signal to the MIMO decoder 730.

The MIMO decoder 730 multiplexes and outputs $N_R$ reception signals provided from the post processor 720 as T signals so that the T channel decoding units 740-1 to 740-T can decode the T signals.

Each of the T channel decoding units 740-1 to 740-T includes a demodulator and a channel decoder to demodulate and decode a signal provided from the transmitter.

The channel estimator 750 estimates channel information via a reference signal transmitted via each transmission beam direction by the transmitter. At this point, when a scan event occurs, the channel estimator 750 estimates channel information for each transmission beam direction. Here, the channel information includes at least one of a Signal-to-Noise Ration (SNR), a Carrier power Interference and Noise power Ratio (CINR) and a Received Signal Strength Indicator (RSSI). At this point, the channel estimator 750 can estimate channel information of a reception beam corresponding to each transmission beam direction.

Each transmission beam direction estimated by the channel estimator 750 to the transmitter. For example, the controller 760 transmits channel information regarding transmission beam directions whose channel state is good to the transmitter.

For another example, in the case where the receiver supports reception BF, the controller 760 can transmit channel information regarding transmission beam directions whose channel state is equal to or greater than a reference value for each reception beam direction to the transmitter.

Also, the controller 760 can select a transmission beam that can obtain an optimal transmission efficiency with the transmitter with consideration of channel information corresponding to each transmission beam direction estimated by the channel estimator 750.

For example, the controller 760 selects a transmission beam direction that can obtain an optimal transmission efficiency with the transmitter with consideration of channel information corresponding to each transmission beam direction estimated by the channel estimator 750. In this case, the controller 760 can determine a reception beam direction for the selected transmission beam direction.

In FIGS. 6 and 7, the controller can perform the function of the beam setting, unit.

Figure 8:
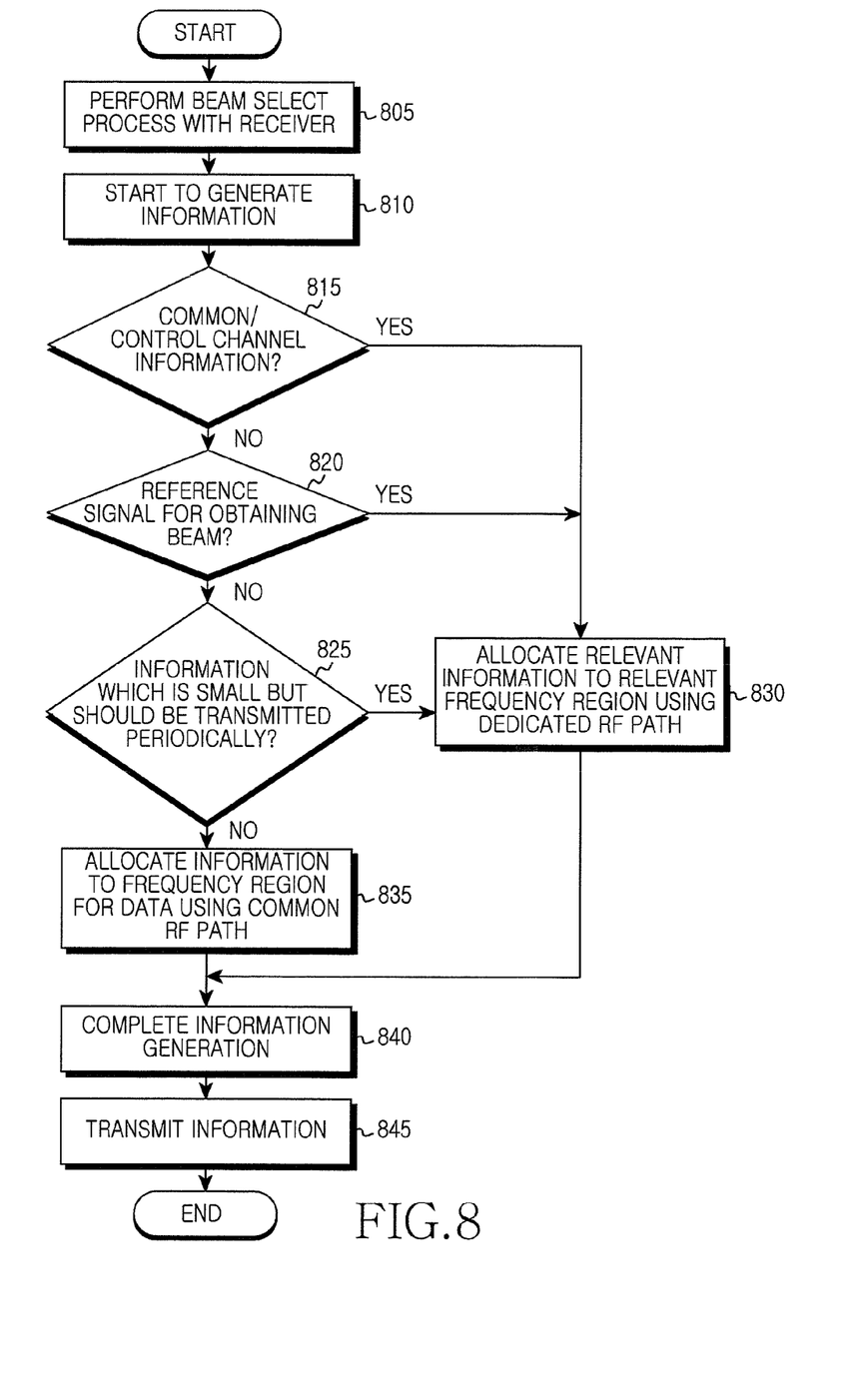
FIG. 8 is a flowchart illustrating a process for operating a transmitter according to an embodiment of the present disclosure.

FIG. 8 is a flowchart illustrating a process for operating a transmitter according to an embodiment of the present disclosure.

Referring to FIG. 8, the transmitter performs a beam select process with the receiver in step 805. Since any beam select process can be used as the beam select process, detailed description thereof is omitted.

After that, the transmitter starts to generate information to transmit to the receiver in step 810.

In the case where information to be included in the information is common and/or control channel information, or the information is a reference signal for obtaining a beam in step 815, or the information is a small but should be transmitted periodically in step 825, the transmitter uses a dedicated RF path and allocates relevant information to a relevant frequency region in step 830. A reference of the size in step 825 can be a set threshold.

In the case where information is not information which is small but should be transmitted periodically, but data, the transmitter uses a common RF path and maps information to a frequency region for data in step 835.

After that, the transmitter completes information generation in step 840, and transmits the generated information in step 845.

The method described above in relation with FIG. 8 under of the present invention may be provided as one or more instructions in one or more software modules, or computer programs stored in an electronic device.

Figure 9:
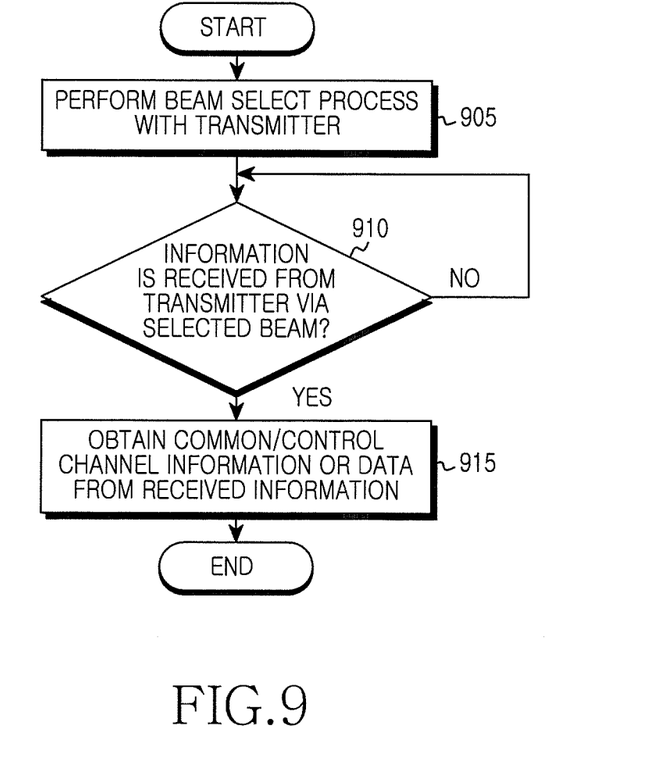
FIG. 9 is a flowchart illustrating a process for operating a receiver according to an embodiment of the present disclosure.

FIG. 9 is a flowchart illustrating a process for operating a receiver according to an embodiment of the present disclosure.

Referring to FIG. 9, the receiver performs a beam select process with a transmitter in step 905. Since any beam select process can be used as the beam select process, detailed description thereof is omitted.

After that, the receiver determines whether information is received from the transmitter via a selected beam in step 910.

After that, when receiving information from a BS via the selected beam, the receiver can obtain information of a common/control channel or data from the received information. Also, the received information can include a reference signal for obtaining a beam or information which is small but should be transmitted periodically, or data in step 915.

The method described above in relation with FIG. 9 under of the present invention may be provided as one or more instructions in one or more software modules, or computer programs stored in an electronic device.

Though the description of FIGS. 4 and 5 has been described based on a downlink, the description is similarly applicable to an uplink. Now, an uplink is described below.

Figure 10:
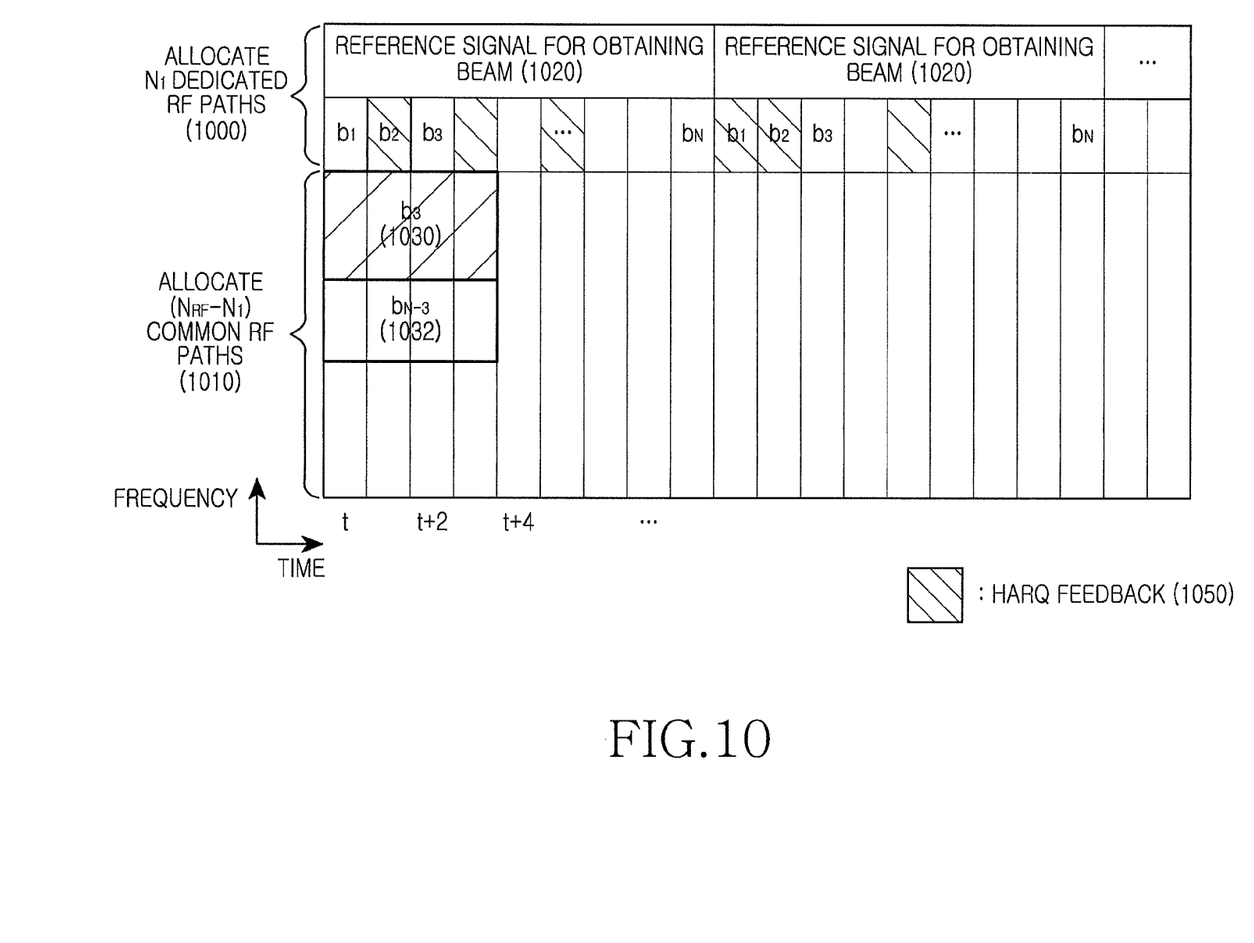
FIG. 10 is a view illustrating an embodiment of applying different BF transmission techniques by allocating a control channel and a data channel to frequency/time resources according to the present disclosure.

FIG. 10 is a view illustrating an example of applying different BF transmission techniques by allocating a control channel and a data, channel to frequency-time resources according to another embodiment of the present disclosure.

Referring to FIG. 10, the same BF transmission method as the method of transmitting information of a data channel in the millimeter wave communication system can be used for transmitting information of a common and/or control channel. For example, before transmission/reception of data, a beam obtain procedure can be performed. One of beam obtain methods is a method of allocating all beams to resources that lie at right angles to find out an optimal transmission/reception beam. Therefore, reference signals required for obtaining a beam are included in a specific frequency resource 1020 among frequency resources 1000 allocated for transmitting information of the common/control channel and transmitted, so that an optimal transmission/reception beam can be found.

The frequency resource 1000 allocated for transmitting the information of the common/control channel can use a Random Access Channel (RACH).

Since the reference signals for obtaining a beam illustrated in FIG. 10 are repeatedly transmitted via a specific frequency resource 1020, a BS can efficiently maintain and update a beam.

Besides BF repeated transmission of information of the common and/or control channel and the reference signals for obtaining a beam, in the case where small information is included and should be periodically transmitted, for example, transmitting an HARQ feedback 1050 or a VoIP data signal, a relevant signal or information can be allocated to a frequency resource 1000.

As described above, in the case where frequently repeatedly transmitted signals are allocated to a frequency resource 1010 to which a data channel is allocated, a corresponding control signal is additionally required, so that the entire system overhead increases.

To solve this problem, frequently repeatedly transmitted signals are allocated to a frequency resource 1000 and can be utilized. Since all beams are repeatedly allocated to the frequency resource 1000, an MS can use the resource without use of an additional RF path and allocation of a control signal by the serving BS by transmitting the resource at an appropriate beam transmission point. The operations of the transmitter and the receiver during the uplink are the same as those in FIGS. 8 and 9.

The present disclosure has an advantage of reducing overhead and raising spectral efficiency in the millimeter wave communication system.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the disclosure has been shown and described with reference to certain exemplary embodiments thereof, it will be understood by those skilled in the art that various changes in form and details may be made therein without departing from the spirit and scope of the disclosure as defined by the appended claims and their equivalents. Therefore, the scope of the present disclosure should not be limited to the above-described embodiments but should be determined by not only the appended claims but also the equivalents thereof.

What is claimed is:

1. A method for operating a transmitter in a wireless communication system, the method comprising:
   mapping control channel information to a first frequency region;
   mapping data to a second frequency region; and
   transmitting the mapped control channel information and the mapped data to a receiver, wherein the mapped control channel information on the first frequency region is transmitted through a dedicated radio frequency (RF) path via a plurality of transmission beams, and wherein the mapped data on the second frequency region is transmitted through a common RF path via at least one of the plurality of transmission beams, wherein the dedicated RF path comprises a dedicated path for processing a signal regarding the control channel information in the transmitter, and
   wherein the common RF path comprises a common path for processing a signal regarding the data in the transmitter.

2. The method of claim 1, further comprising:
   mapping a reference signal to third frequency region, wherein the third frequency region is included in the first frequency region, and wherein the reference signal comprises information associated with a state of one or more of the plurality of transmission beams.

3. The method of claim 1, further comprising:
   mapping periodic information to the first frequency region when the periodic information comprises a size that is less than a threshold.

4. The method of claim 1, wherein the at least one of the plurality of transmission beams is selected by a beam selection procedure between the transmitter and the receiver.

5. An apparatus of a transmitter in a wireless communication system, the apparatus comprising:

a transceiver; and a controller operatively coupled to the transceiver, wherein the controller is configured to map control channel information to a first frequency region, and map data to a second frequency region, wherein the transceiver is configured to transmit the mapped control channel information and the mapped data to a receiver, wherein the mapped control channel information on the first frequency region is transmitted through a dedicated radio frequency (RF) path via a plurality of transmission beams, and wherein the mapped data on the second frequency region is transmitted through a common RF path via at least one of the plurality of transmission beams, wherein the dedicated RF path comprises a dedicated path for processing a signal regarding the control channel information in the transmitter, and wherein the common RF path comprises a common path for processing a signal regarding the data in the transmitter.

6. The apparatus of claim 5, wherein the controller is further configured to map a reference signal to a third frequency region, wherein the third frequency region is included in the first frequency region, and wherein the reference signal comprises information associated with a state of one or more of the plurality of transmission beams.

7. The apparatus of claim 5, wherein the controller is further configured to map periodic information to the first frequency region when the periodic information comprises a size that is less than a threshold.

8. The apparatus of claim 5, wherein the at least one of the plurality of transmission beams is selected by a beam selection procedure between the transmitter and the receiver.

9. A method for operating a receiver in a wireless communication system, the method comprising:

receiving control channel information via a first frequency region; and receiving data via a second frequency region, wherein the control channel information on the first frequency region is transmitted, by a transmitter, through a dedicated radio frequency (RF) path via a plurality of transmission beams, and wherein the data on the second frequency region is transmitted, by the transmitter, through a common RF path via plurality of transmission beams, wherein the dedicated RF path comprises a dedicated path for processing a signal regarding the control channel information in the receiver, and wherein the common RF path comprises a common path for processing a signal regarding the data in the receiver.

10. The method of claim 9, further comprising:

receiving a reference signal via a third frequency region included in the first frequency region, wherein the reference signal comprises information associated with a state of one or more of the plurality of transmission beams.

11. The method of claim 9, further comprising:

obtaining periodic information via the first frequency region when the periodic information comprises a size that is less than a threshold.

12. The method of claim 9, wherein the at least one of the plurality of transmission beams is selected by a beam selection procedure between the transmitter and the receiver.

13. An apparatus of a receiver in a wireless communication system, the apparatus comprising:

a transceiver configured to receive a signal from a transmitter; and a controller operatively coupled to the transceiver, wherein the controller is configured to receive control channel information via a first frequency region, and receive data via a second frequency region, wherein the control channel information on the first frequency region is transmitted through a dedicated radio frequency (RF) path via a plurality of transmission beams, and wherein the data on the second frequency region is transmitted through a common RF path via at least one of the plurality of transmission beams, wherein the dedicated RF path comprises a dedicated path for processing a signal regarding the control channel information in the receiver, and wherein the common RF path comprises a common path for processing a signal regarding the data in the receiver.

14. The apparatus of claim 13, wherein the controller is further configured to receive a reference signal via a third frequency region included in the first frequency region, wherein the reference signal comprises information associated with a state of one or more of the plurality of transmission beams.

15. The apparatus of claim 13, wherein the controller is further configured to obtain periodic information via the first frequency region when the periodic information comprises a size that is less than a threshold.

16. The apparatus of claim 13, wherein the at least one of the plurality of transmission beams is selected by a beam selection procedure between the transmitter and the receiver.

* * * * *